United States Patent
Hajdu et al.

(10) Patent No.: US 10,841,248 B1
(45) Date of Patent: *Nov. 17, 2020

(54) CONNECTION SPECIFIC SELECTION OF AUTOMATED RESPONSE MESSAGES

(71) Applicants: Loralee Hajdu, North Vancouver (CA); Oliver Hajdu, North Vancouver (CA)

(72) Inventors: Loralee Hajdu, North Vancouver (CA); Oliver Hajdu, North Vancouver (CA)

(*) Notice: Subject to any disclaimer, the term of this patent is extended or adjusted under 35 U.S.C. 154(b) by 73 days.

This patent is subject to a terminal disclaimer.

(21) Appl. No.: 15/950,887

(22) Filed: Apr. 11, 2018

Related U.S. Application Data

(63) Continuation-in-part of application No. 15/462,874, filed on Mar. 19, 2017, now Pat. No. 9,979,826.
(Continued)

(51) Int. Cl.
*H04M 1/64* (2006.01)
*H04L 12/58* (2006.01)
(Continued)

(52) U.S. Cl.
CPC ............ *H04L 51/02* (2013.01); *H04W 4/14* (2013.01); *H04W 4/80* (2018.02)

(58) Field of Classification Search
CPC ............ H04L 51/02; H04W 4/14; H04W 4/80
See application file for complete search history.

(56) References Cited

U.S. PATENT DOCUMENTS

| 8,989,820 B2 | 3/2015 | Czaja |
| 9,049,105 B1 * | 6/2015 | Feinstein ............ H04L 41/069 |

(Continued)

OTHER PUBLICATIONS

"Iphone User Guide for iOS 11", dated Sep. 19, 2017, "Do Not Disturb while driving", downloaded from https://help.apple.com/iphone/11/#/iphae754533b on Apr. 12, 2018 entire document.
(Continued)

*Primary Examiner* — Solomon G Bezuayehu
(74) *Attorney, Agent, or Firm* — Stephen E. Zweig

(57) ABSTRACT

Software and computer processor implemented system and method of providing customized automated responses to different types of incoming electronic messages from various contact sources, particularly useful for preventing distracted driving or distractions at a place of work or at a place of rest and relaxation. Here the invention's software, often in the form of an app, runs on a smartphone or other computerized device configured to automatically connect to various devices, such as automobile associated Bluetooth peripherals or WiFi access points/routers. When operating, the invention determines what peripheral connections are active, and uses these to automatically select responses to various incoming messages. Optionally, different automated responses can be assigned to different connected device identification codes or different incoming message originators. Various prioritization schemes, such as last active connection dominates, and various ways in which different contact specific automated responses may interact with various device specific automated responses, are also discussed.

22 Claims, 10 Drawing Sheets

Related U.S. Application Data which is a continuation-in-part of application No. 15/249,372, filed on Aug. 27, 2016, now Pat. No. 9,602,988, which is a continuation-in-part of application No. 14/273,748, filed on May 9, 2014, now Pat. No. 9,432,499.

(60) Provisional application No. 61/825,017, filed on May 18, 2013.

(51) Int. Cl.
*H04W 4/14* (2009.01)
*H04W 4/80* (2018.01)

(56) References Cited

U.S. PATENT DOCUMENTS

| | | | |
|---|---|---|---|
| 2002/0065657 A1 | 5/2002 | Reding | |
| 2005/0124324 A1 | 6/2005 | Thomas | |
| 2007/0130274 A1* | 6/2007 | Lee | H04L 51/38 709/206 |
| 2010/0216509 A1* | 8/2010 | Riemer | H04M 1/72577 455/557 |
| 2011/0151842 A1 | 6/2011 | Olincy | |
| 2011/0258276 A1* | 10/2011 | Robins | H04L 67/24 709/206 |
| 2011/0295458 A1 | 12/2011 | Halsey-Fenderson | |
| 2012/0064924 A1* | 3/2012 | Schapsis | H04L 69/28 455/466 |
| 2012/0117169 A1 | 5/2012 | Plotkin | |
| 2013/0097269 A1 | 4/2013 | Plotkin | |
| 2013/0097270 A1 | 4/2013 | Plotkin | |
| 2013/0157629 A1* | 6/2013 | Lee | H04M 3/436 455/414.1 |
| 2013/0165171 A1 | 6/2013 | Pai | |
| 2013/0324081 A1 | 12/2013 | Gargi | |
| 2013/0331034 A1 | 12/2013 | Tucker | |
| 2014/0066053 A1* | 3/2014 | Burke | H04W 4/00 455/426.1 |
| 2014/0206321 A1* | 7/2014 | Mohapatra | H04M 3/42068 455/413 |

OTHER PUBLICATIONS

"Android's Do Not Disturb driving mode is going big in 2018", dated Nov. 10, 2017, downloaded from https://www.slashgear.com/androids-do-not-disturb-driving-mode-is-going-big-in-2018-10507580/ on Apr. 12, 2018 entire document.

"Windows Phone 8 Update 3: Driving Mode", dated Oct. 15, 2013, downloaded from http://www.itprotoday.com/management-mobility/windows-phone-8-update-3-driving-mode on Apr. 12, 2018, entire document.

"Windows Phone 8 Update 3 (GDR3)", Dated Oct. 25, 2013, downloaded from https://www.windowscentral.com/windows-phone-8-update-3 on Apr. 12, 2018, entire document.

Hands-Free Profile 1.7 Bluetooth® Profile Specification, published Sep. 18, 2014 (cited in specification [0036]), uploaded from https://www.bluetooth.org/docman/handlers/DownloadDoc.ashx?doc_id=292287 on Jul. 13, 2020.

pp. 1-563 of Specification of the Bluetooth System Wireless connections made easy Master Table of Contents & Compliance Requirements Covered Core Package version: 2.0 + EDR Current Master TOC issued: Nov. 4, 2004. Uploaded from http://netlab.cs.ucla.edu/wiki/files/btv20.pdf on Jul. 11, 2020.

* cited by examiner

CONNECTION SPECIFIC SELECTION OF AUTOMATED RESPONSE MESSAGES

CROSS REFERENCE TO RELATED APPLICATIONS

This application is a continuation in part of U.S. patent application Ser. No. 15/462,874, filed Mar. 19, 2017; application Ser. No. 15/462,874 was a continuation in part of U.S. patent application Ser. No. 15/249,372, filed Aug. 27, 2016, now U.S. Pat. No. 9,602,988 issued Mar. 21, 2017; application Ser. No. 15/249,372 was a continuation in part of application Ser. No. 14/273,748, "PERIPHERAL SPECIFIC SELECTION OF AUTOMATED RESPONSE MESSAGES", filed May 9, 2014, now U.S. Pat. No. 9,432,499 issued Aug. 30, 2016; application Ser. No. 14/273,748 claimed the priority benefit of U.S. provisional patent 61/825,017 "PERIPHERAL SPECIFIC SELECTION OF AUTOMATED RESPONSE MESSAGES", inventors Loralee Hajdu and Oliver Hajdu, filed May 18, 2013, the entire contents of all of these applications are incorporated herein by reference.

BACKGROUND OF THE INVENTION

Field of the Invention

This invention is in the field of automated telephone, email, and SMS message response schemes for communications network connected computerized systems and devices, such as smartphones, tablets or other devices which also have an ability to connect by either wired or wireless links to one or more peripherals or networks.

Description of the Related Art

Since the invention of the first telephone answering machine, electronic systems that produce automated response messages to various incoming telephone calls, email, text messages, and other forms of electronic communication have become common.

Such automated response systems are particularly useful for smartphones or other handheld computerized devices that are also connected to various communications networks (e.g. cellular networks, Internet, telephone lines, and the like). This is particularly important because often incoming messages may come at an inconvenient time, such as while the smartphone user is driving, in a conference, trying to get some quiet personal time, or other situation.

As smartphones have proliferated, distracted driving has become a major safety problem. As an example, On Apr. 3, 2014, Alessandra Malito of NBC News reported on a US Department of Transportation study that found that in 2012, more than 3,000 people were killed in accidents from distractions, and about 421,000 people were injured. Anthony Foxx, secretary of transportation in fact stated that: "Texting and cell phone use behind the wheel significantly increases a driver's risk of crashing," and "Even a single, momentary distraction while driving can cause a lifetime of devastating consequences." Indeed, the US government has set up a website, Distraction.gov, just to raise awareness of this problem. This site states that 71% of teens and young adults have composed/sent SMS messages while driving, and that 78% of teens and young adults have read an SMS message while driving.

Although states and countries have responded by passing various types of no-texting while driving laws, these laws are difficult to enforce because often texting while driving is invisible to outside viewers.

Thus improved methods to discourage texting while driving would save many lives, and improve public safety.

BRIEF SUMMARY OF THE INVENTION

The invention is based, in part, on the insight that prior art automatic answering or response systems are suboptimal in that they do not allow users enough flexibility to program in a variety of different automatic response messages in advance. Prior art automatic response systems also did not apply an optimal amount of intelligence in determining under which situations different automatic response answers should be used.

The invention is also based, in part, on the insight that modern computerized devices and systems often operate with the aid of one or more connected peripheral devices (peripherals) or networks. Such connected peripherals or networks will generally be connected to the main part of the computerized system by various types of connections that allow signals and data to be transferred at least one way from the peripheral to the computerized system, or the computerized system to the peripheral or network. Such connections include direct electrical wire connections, other physical connections, as well as various types of wireless connections (e.g. Bluetooth® connections, Wi-Fi connections, and the like). Some peripherals are even connected by optical connections (e.g. infrared connections) or audio connections. These peripherals may be many different types of peripheral devices, such as various headsets, speakerphones, cameras, earphones, remote controls, and the like.

The invention is also based, in part, on the insight that there is often a predictable context in which a user may connect a given peripheral or network to the user's computerized systems. For example, in the case where the user's computerized system is a smartphone, the user may connect a first type of Bluetooth speakerphone to the smartphone while the user is driving in a car. The same user may connect a second type of Bluetooth headset to the smartphone while the user is out walking or exercising. The use may also frequently connect to other peripherals as well in other various predictable situations. In another example, a user may connect to a particular WiFi network when at work, and another when at the gym.

The invention is also based, in part on the insight of providing an improved automatic answering system that, at least in part, is able to adjust its automatic answering messages depending upon which peripherals or networks are presently connected to the computerized system. More specifically, the invention teaches a novel type of automatic answering or response system that provides peripheral or network specific selection of various types of automated response messages.

Thus in some embodiments, the invention may be a software and computer processor mediated system and method of providing customized automated responses to different types of incoming electronic messages from various contact sources or other items in a dataset of items. Here the invention may be implemented in the form of software, which in turn is run on a computerized system such as a smartphone that is also capable of connecting to various peripherals or networks, each with their own identification code.

Note that in this context, the peripheral identification code may be a Bluetooth™ peripheral device identification code or other computer coded embedded identifier, or other smartphone detectable peripheral device code, or alternatively may even be the electrical connection by which a particular device connects to the smartphone. Thus, for example, a headphone or headset connecting via the smartphone's audio output (or input/output) jack can also be considered to have a peripheral identification code because the smartphone can determine by polling the status of the audio jack if a headphone or headset device is connected. Note, however, that typically, the peripheral device identification code will not be a telephone number.

In some embodiments, the system may operate by merely identifying a class or type of peripheral, and will not need, for example, to distinguish between individual peripherals within a general class or type of peripheral.

The invention's software allows different automated responses to be assigned to different peripherals and networks (often by way of different peripheral identification codes or network names) so that the automated response can vary depending on which peripherals or networks are connected to the computerized device. As previously discussed, this peripheral or network connection can be by either a wired (e.g. audio jack or USB/iPhone connector) or wireless (e.g. Bluetooth, WiFi) connection. This disclosure will also discuss various prioritization schemes, such as "last peripheral connected selects the response message", as well as various ways in which different contact-specific automated responses may interact with various peripheral-specific automated responses.

Although the invention may be used in many situations, from a public safety perspective, the invention is particularly useful for preventing problems while operating any kind of machinery, heavy machinery or even equipment such as in a factory or assembly line, such as distracted driving and the like, particularly with regards to preventing distractions.

It is common, for example, for automobiles to contain one or more automobile specific Bluetooth devices (either built directly into the car, or alternatively as part of car-mounted after-market equipment, or worn by the driver in the form of a headset or earpiece which is kept in the vehicle) or a physical connection such as a smartphone or device dock. Thus in some embodiments, the invention makes use of the fact that close proximity to automobile associated Bluetooth peripherals is often an excellent indicator that the user is driving, and thus should not be distracted by various incoming messages.

DETAILED DESCRIPTION OF THE INVENTION

Abbreviation: Throughout this disclosure, the trademarked term Bluetooth® is used to denote the IEEE 802.15 standard for short-range wireless communications. However, this term may also be read more broadly as teaching other types of bidirectional short range wireless communication links as well.

SMS is the abbreviation of "Short Message Service", a text messaging service frequently used for cell phones, smartphones, and other devices.

MMS is the abbreviation of "Multimedia Messaging Service", an extension of SMS that is a standard way to send text and/or additional multimedia content (e.g. text, videos, pictures, ringtones etc.) between cell phones, smartphones, and other devices.

Other message types may include email, Google hangout messages, other social network messages, and the like.

Figure 1:
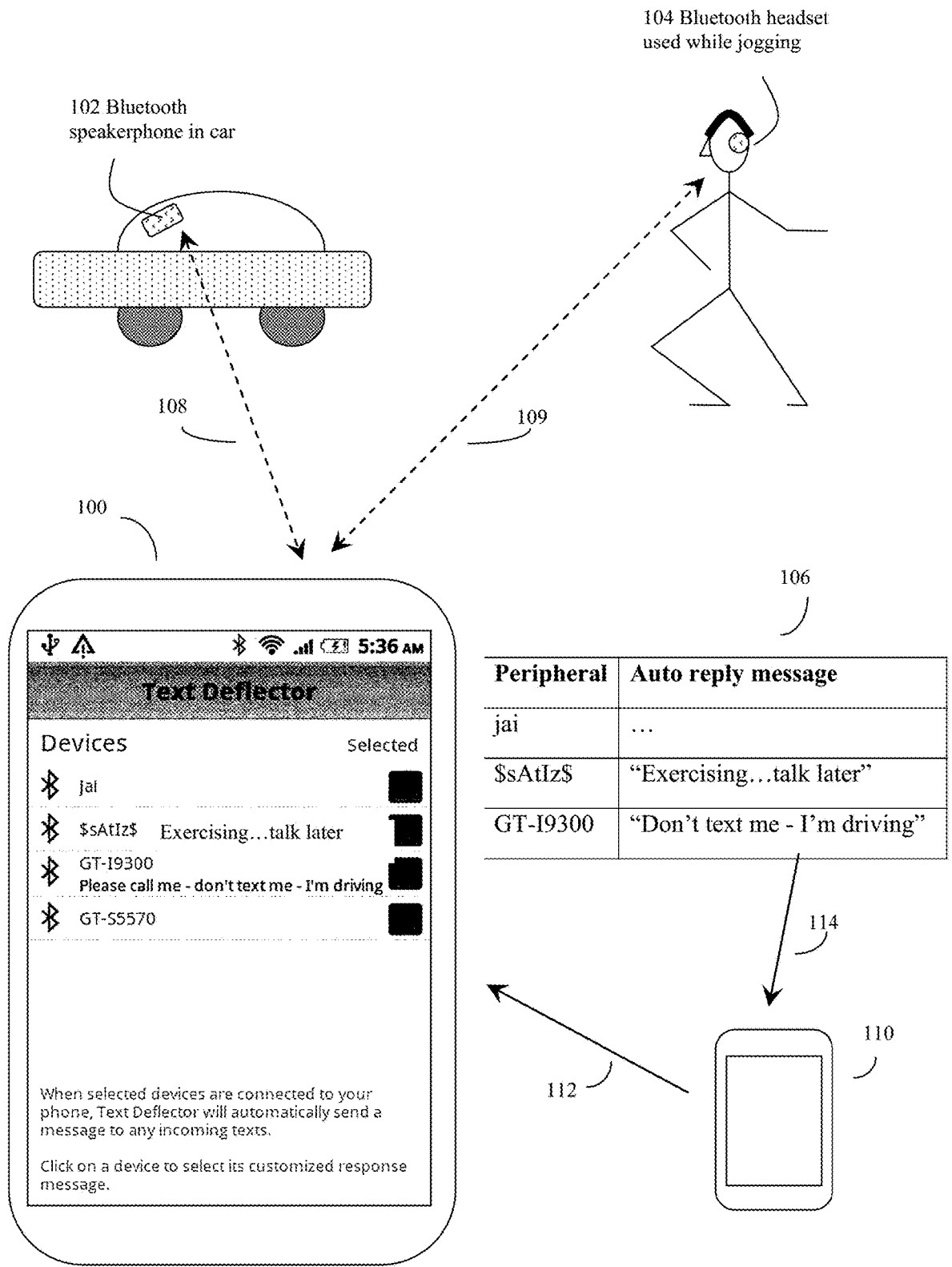
FIG. 1 shows a schematic overview of the invention.

FIG. 1 shows a schematic overview of the invention.

In FIG. 1, a computerized system or computerized device (100) is shown. This computerized system will be generally comprised of at least one processor, memory, software (such as operating system software), at least one method of connectivity, such as a long-range communications interface (often a wireless interface such as a 3G, 4G, or 5G cellular telephone and/or Wi-Fi transceiver), peripheral interface devices (such as a short range wireless Bluetooth transceiver, wire jacks for hard wired peripherals, and the like), and usually a user interface, such as a Graphical User Interface (GUI) that is capable of both displaying messages, and receiving user input. Examples of such computerized systems can include smartphones (e.g. Apple iPhones, Android smartphones, and the like), tablet computers, personal computers, or even embedded computers, such as computers embedded into vehicles and other devices.

The computerized system (100) is generally configured to be able to connect (e.g. exchange information with) to one or more peripheral devices, here exemplified by a car-mounted Bluetooth speakerphone (102), as well as a Bluetooth headset (104) typically worn by the user while exercising. Each device, such as a peripheral device will generally either have its own identification code (e.g. a peripheral device identification code) or other way by which the computerized system (100) can identify when that particular peripheral is attached to the system (100).

In addition to identification codes, one example of another way by which the computerized system (100) can identify that a particular peripheral is attached to the system (100) is by use of metadata or other information that is normally "hidden" from the user, but which may either be provided by the peripheral, or alternatively may be associated with certain messages that the peripheral is transmitting to the computerized system (100).

Use of Bluetooth profile information: This embodiment can make use of the fact that different types of Bluetooth devices often have different Bluetooth profiles. As an example, the Bluetooth Hands-Free Profile (HFP) is often used by automobile installed hands-free (HF) devices. The Bluetooth Hands-Free Profile 1.7, released Sep. 18, 2014. According to this protocol, after an initial connection is established, the Hands-Free device (102) will typically transmit a list of supported features, such as supported HF indicators, to the audio gateway (AG—e.g. the user's smartphone 100). In the Hands-Free Profile 1.7, these are typically 16-bit assigned numbers with standard Bluetooth assigned number definition that the invention can use to, for example, further identify that the peripheral device that the smartphone (100) is connected to may be a device that is typically installed into automobiles.

Thus here, for example, by making use of suitable Bluetooth profile information, the process by which the invention is configured to interact with previously unknown peripherals can be automated or at least semi-automated. This can potentially cut down on the number of user configuration screens needed to initially set up the invention, as well as allow the invention to work more seamlessly in novel situations, such as when the user may be driving for the first time in a rental car or otherwise using new peripherals for the first time.

Other Bluetooth profiles may also be used according to the invention. As another example, the presence of Bluetooth devices giving messages according to the Bluetooth Health Device Profile (HDP) can help inform the system if the smartphone (100) or other device is presently being used in a healthcare context, which might, therefore, require suitable automatic replay messages. The Bluetooth Device ID profile (DIP) can also be used by the system to automatically or semi-automatically identify new Bluetooth peripherals, and the system can use information obtained from the profile to at least suggest a suitable operating mode, or even automatically configure itself for an operating mode appropriate for the DIP device.

In some cases, in addition to having useful profile information, certain peripherals may also transmit messages with encoded metadata that also gives information that the invention can use for automated response purposes. Again using Bluetooth as an example, certain Bluetooth equipped peripherals are able to receive metadata from the smartphone (100), or transmit metadata to the smartphone (100) that also gives useful information for auto response purposes. Thus in some embodiments, the invention may be configured to use metadata received from the peripheral for auto response control purposes.

Generally, the computerized system (100) will also be running the invention's automatic response software, sometimes referred to as "reply software". If the system (100) is a smartphone or a tablet computer, this automatic response software (reply software) will often be loaded into the memory of system (100) as an "app", but as will be discussed, this "reply software" can alternatively be a part of the operating system as well.

Among other functions, which will be discussed, the invention's software will typically maintain, in device memory, an association between particular peripherals and particular auto reply messages. This memory stored peripheral-reply message association is symbolized by table (106).

Table (106) shows, for example, that one peripheral, such as $sAtIz$ (here assume that this is headset peripheral 104), which is associated with the auto reply message "Exercising . . . talk later". By contrast, another car mounted peripheral, such as GT-I9300 (here assume that this is peripheral 102) is associated with the auto reply message "Please call me—Don't text me—I'm driving".

In examples outlined, the type of message providing a distraction might additionally arrive to the User in the form of a Social Media interaction, an incoming Video type message or any other types of communications to be developed including chats and the like.

The invention software is configured so that, in the event that, for example, the car Bluetooth speakerphone peripheral (102), is connected (108) to the computer system (100), then the invention's software will detect this fact. As a result, when an outside contact (110) attempts to communicate with (100) by, for example, sending an SMS text message (112), the software will use the fact that the car Bluetooth speakerphone (102) is connected (108) to system (100) to deduce, using association (106), that the appropriate auto reply message to use is the driving specific automatic reply message "Please call me—don't text me—I'm driving" (114). The software will thus send out the above driving related automatic reply message.

By contrast, if instead the headset peripheral (104), which the user primarily uses during jogging is connected (109) to (100), then the system software (106) will determine that a different peripheral is connected. Here, assuming that the user has appropriately configured the system, the software will use association (106) to instead determine that the exercising type automatic reply message "Exercising . . . talk later" should be used to automatically reply or otherwise manage the outside contact (100). As will be discussed, this basic peripheral controlled auto response method can be modified in various ways. For example, in the event that multiple peripherals are connected at the same time, then some sort of priority scheme needs to be used in order to determine which peripheral should be used to generate the automatic response. Many different types of priority schemes are possible. In some embodiments, the user may be given configuration options that allow total control over this priority selection process. In other embodiments, at least as a default priority, often the last peripheral connected will be given the highest priority, and the automatic response associated with the last connected peripheral will be selected, until the user specifies otherwise and/or until the last connected peripheral is disconnected.

Similarly this basic peripheral controlled auto response scheme may, in some embodiments, apply to all incoming messages regardless of who the contact is (e.g. regardless of which person or organization calls). In other embodiments, at least certain contacts (e.g. boss, wife, friends, parents) or other dataset comprising a plurality of dataset items may be given their own automatic response messages that can, again according to choice of override scheme, override or not override the peripheral associated automatic reply messages.

In some modes, the system may require the user to authorize some or all automatic responses by, for example, beeping and requesting authorization (e.g. touch, voice authorization, etc.) before the system automatically transmits the previously automatically selected response. For example, the system could audibly announce over a speaker or headset: "text message from wife, press or say OK to send automatic response?", and then listen for an appropriate verbal permission, or keypress, before sending the automatically selected response, or not.

Put alternatively, in these embodiments, in response to an incoming message obtained from at least one wireless cellular network transceiver, the system will use an automatically selected and retrieved at least one peripheral connection linked automatic reply to respond to the incoming message, but the system need not necessarily automatically respond to the incoming message. Instead, the system can use the previously discussed automatically selected and retrieved at least one peripheral connection linked automatic reply to find the suitable reply, but then, before completing the response, optionally requesting user permission (e.g. user input) authorizing the system to respond to the incoming message. That is, requesting user input before sending the response. So in effect, in this embodiment, the response can be any of an automatic response and an after obtaining user permission/input type response.

In general, any priority scheme for handling all permutations of peripherals and contacts is contemplated, and the software may be configured to allow the user total control over this priority scheme. In other embodiments, at least as a default to be used in the absence of explicit user priority instructions, certain more specific priority schemes may be used, and these will be discussed in more detail as follows below.

Note that although, as previously discussed, short range wireless connections to peripherals, such as the Bluetooth wireless protocol, are frequently used throughout this specification as examples of a connection scheme between a computerized system (100) and various peripherals, these examples are not intended to be limiting. Indeed any connection scheme that enables the system (100) to exchange information or signals with the peripherals is considered to be a valid connection scheme according to the invention. Thus, for example, even an analog earphone, plugged into an analog speaker jack, may be considered to be a peripheral that can be used to control an auto reply response message so long as the computerized system (100) can detect when that particular peripheral is connected, and when it is not. The same is true of connecting a vehicle with a smartphone or device dock to the computerized system (100) via a physical data connection.

The following figures and discussions focus on one particular embodiment of the invention, here in the form of a prototype app intended for a smartphone such as an Apple iOS smartphone or Android smartphone. Again, these discussions are not intended to be limiting.

Figure 2A:
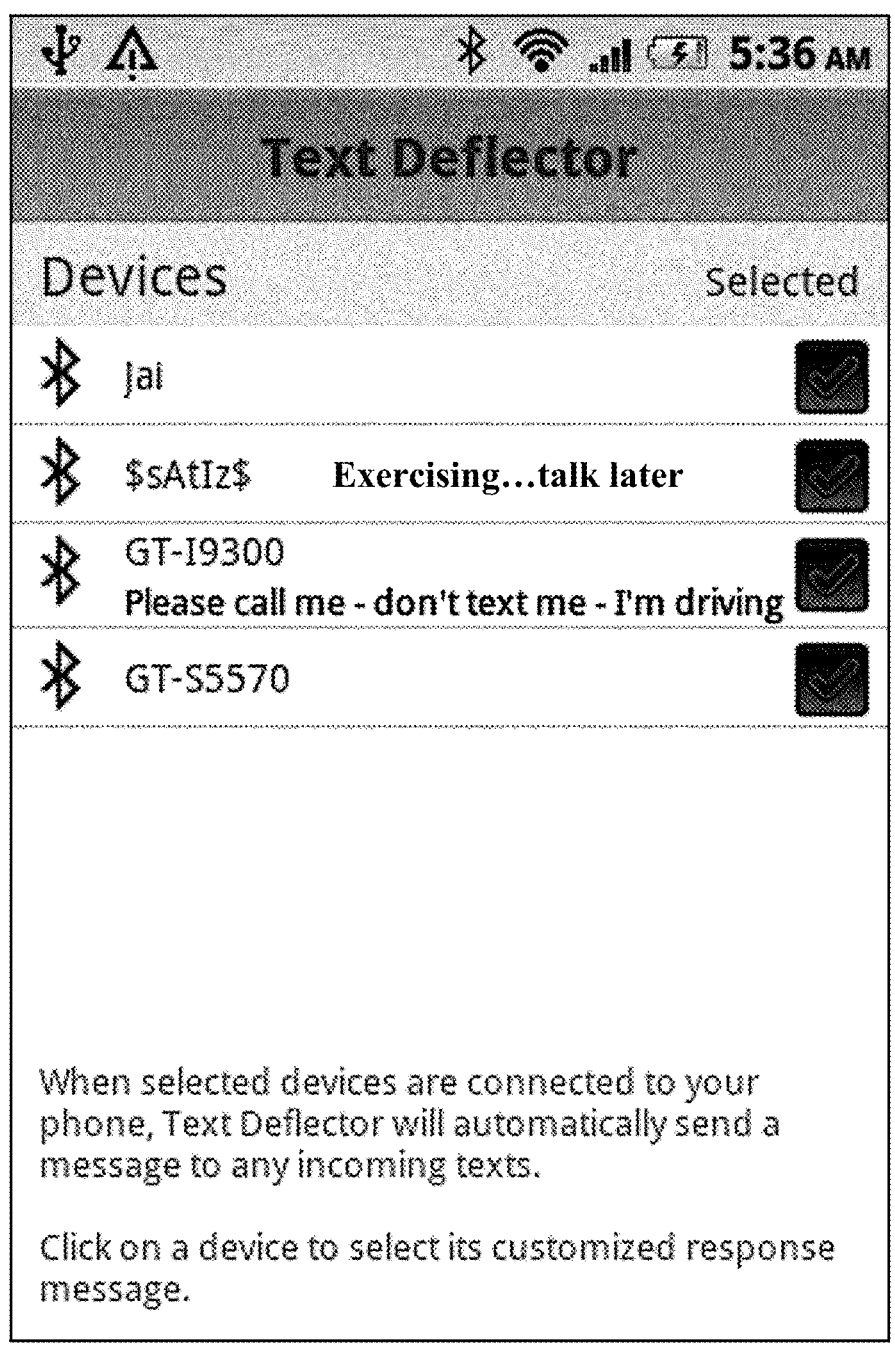
FIG. 2A shows a screenshot of one embodiment of the invention's peripheral configuration menu, showing how the user can turn on and turn off certain automatic responses.

FIG. 2A shows a screenshot of one embodiment of the invention's peripheral configuration menu. In this example, the various peripherals are called "devices", and these various devices all connect to the computerized system (here an Android Smartphone) via wireless Bluetooth™ connections. The user can configure the interface in advance with suitable permissions so that the invention will produce the selected auto responses, or alternatively change permissions so that, for example, if the user so desires, the user can turn on or turn off the automatic responses quickly depending upon the user's given situation. Thus for example, although absent suitable user authorization, the system will not respond to a connection from peripheral GT-I9300 with a "Please call me—don't text me—I'm driving message", if the user so authorizes, the system will take this previously automatically selected response message, and send an automatic reply to the sender accordingly.

Figure 2B:
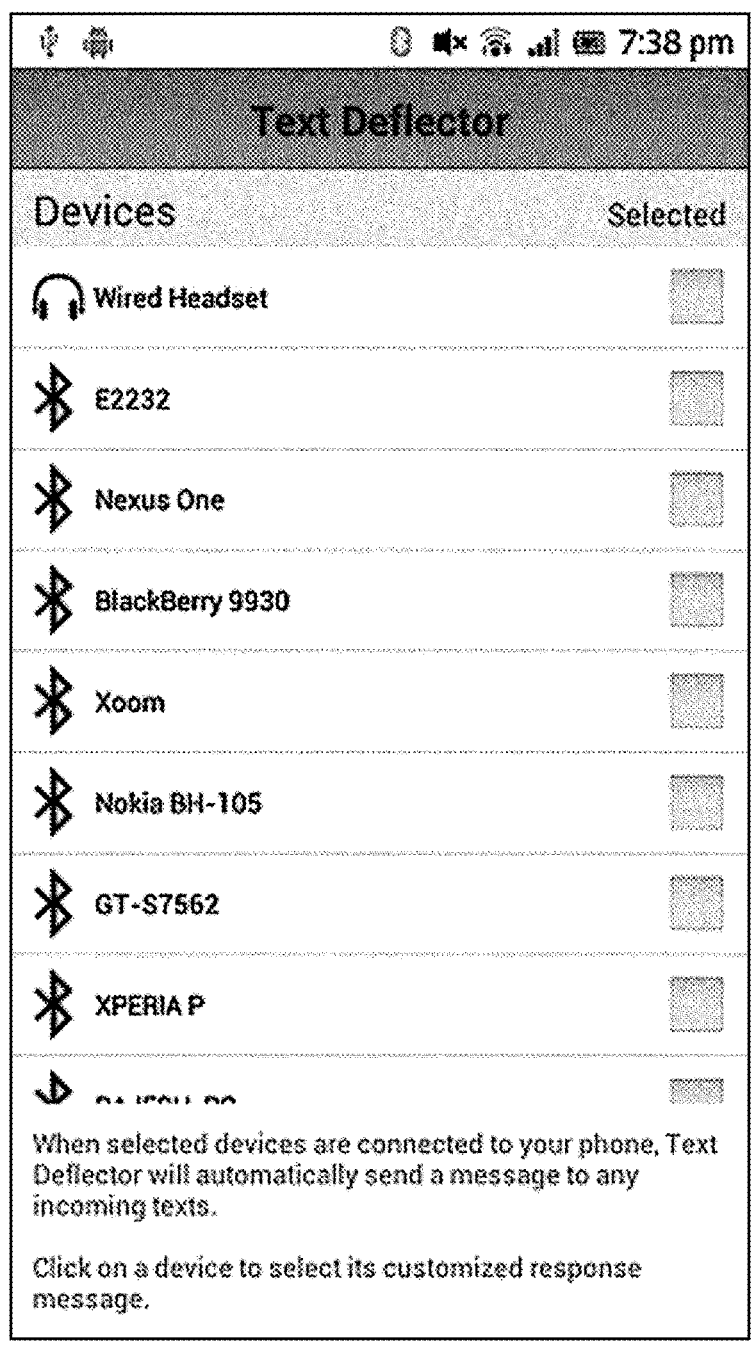
FIG. 2B shows a screenshot of another embodiment of the invention's peripheral configuration menu, here showing a wide range of alternative Bluetooth peripherals that may be used to control the system's auto answer response messages. Here the auto-answer messages assigned to each peripheral are not shown.

FIG. 2B shows another embodiment of the invention's peripheral configuration menu, here showing a wide range of alternative Bluetooth peripherals that may be used to control the system's auto answer response messages. Here the auto-answer messages assigned to each peripheral are not shown.

Here, the list shows all currently connected Bluetooth devices, as well as other Bluetooth devices that were checked and previously connected, but which are not currently connected.

In an alternative embodiment, peripherals that connect by other methods, such as hardwire connections (e.g. via an analog audio connector jack) may also be shown on this screen.

FIG. 2B shows a screenshot of another embodiment of the invention's peripheral configuration menu, here showing a wider range of alternative Bluetooth peripherals that may be used to control the system's auto answer response messages. Here the auto-answer messages assigned to each peripheral are not shown.

Figure 2C:
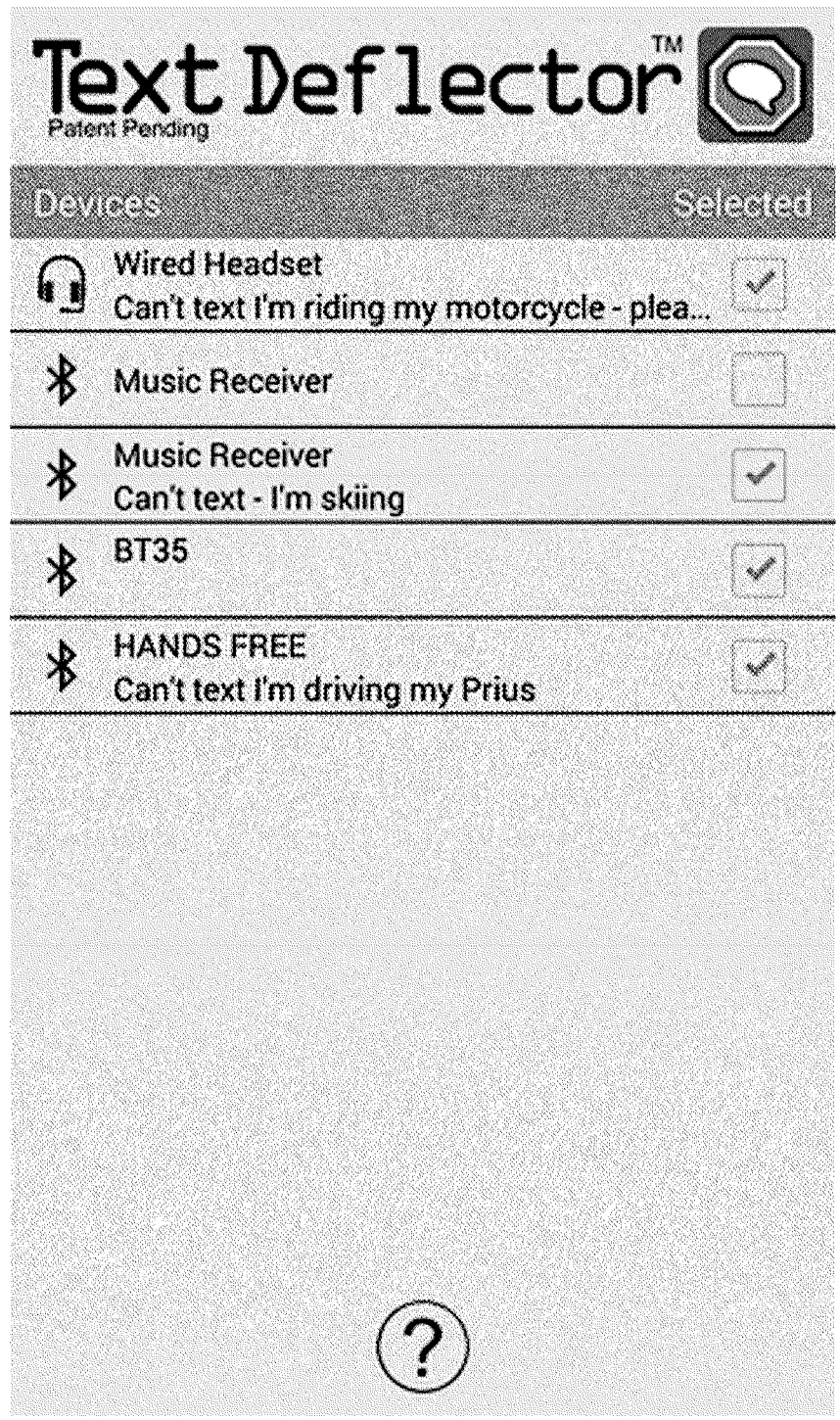
FIG. 2C shows a screenshot of the premium Android version of the product.

FIG. 2C shows a screenshot of an Android version of the product, in which the system enables the user to configure which devices, when connected, will trigger an automatic response to incoming messages or other interactions, such as from an item on a dataset list. The screen also shows the various default messages that will be triggered when a particular peripheral is connected. Note that in this example, the user habitually uses his wired headset when he is on his motor cycle, habitually uses his Bluetooth Music Receiver when he is skiing, and habitually uses his automobile's (Toyota Prius) built in Bluetooth hands free receiver when he is driving. The user can also click a button to turn the automatic response on and off as desired.

Figure 3:
FIG. 3 shows a screenshot of one embodiment of the invention's user interface screen where the user can edit the auto answer message that the user wishes to link to a particular peripheral device.

FIG. 3 shows a screenshot of one embodiment of the invention's user interface screen where the user can edit the auto answer message that the user wishes to link to a particular peripheral device or contact. System default auto reply messages may also be shown on this interface screen.

In this scheme, when a user first informs the system that a new peripheral device is to be used for auto answering purposes, the system will then also provide a device message screen (shown in FIG. 3) to inform the computerized system which default auto answer message to use when that particular peripheral device is connected.

In this particular embodiment, where the computerized system is a smartphone with a touch sensitive display screen, to change a particular device auto answer message, the user may click (e.g. touch) the device's name. When the device next connects to the computerized system, the system can then set the current auto answer message to be the same as that particular device's auto answer message. That is, the system will use whatever message the user had previously entered into the "messages" screen in FIG. 3.

In this particular embodiment, which is oriented to auto responding to SMS text messages, to fit within SMS message length, and also to promote the system (at least for a free version) the user entered automatic answer message is limited to a total length of 136 characters, and 24 characters of this total length are further reserved for final non-editable advertising tagline in at least the freeware form of the invention. This tagline may optionally be removed or replaced with a user edited version in a paid version.

The user may also be given the option to further link the automatic response messages to other devices or other contacts. This may be done by configuring the system to provide a separate contact screen for this purpose, or by configuring the system to allow the user to alter the listing of these links below the edit box in the present screen. The user may also remove a previously entered automatic response message by blanking out the message by backspacing, using a delete button, or other method.

In some embodiments, because a particular automatic response message may be linked to more than one peripheral or more than one contact, it will be useful to remind the user of this fact when the user decides to edit a particular peripheral-linked automatic response. This sort of warning is shown in FIG. 4.

Figure 4:
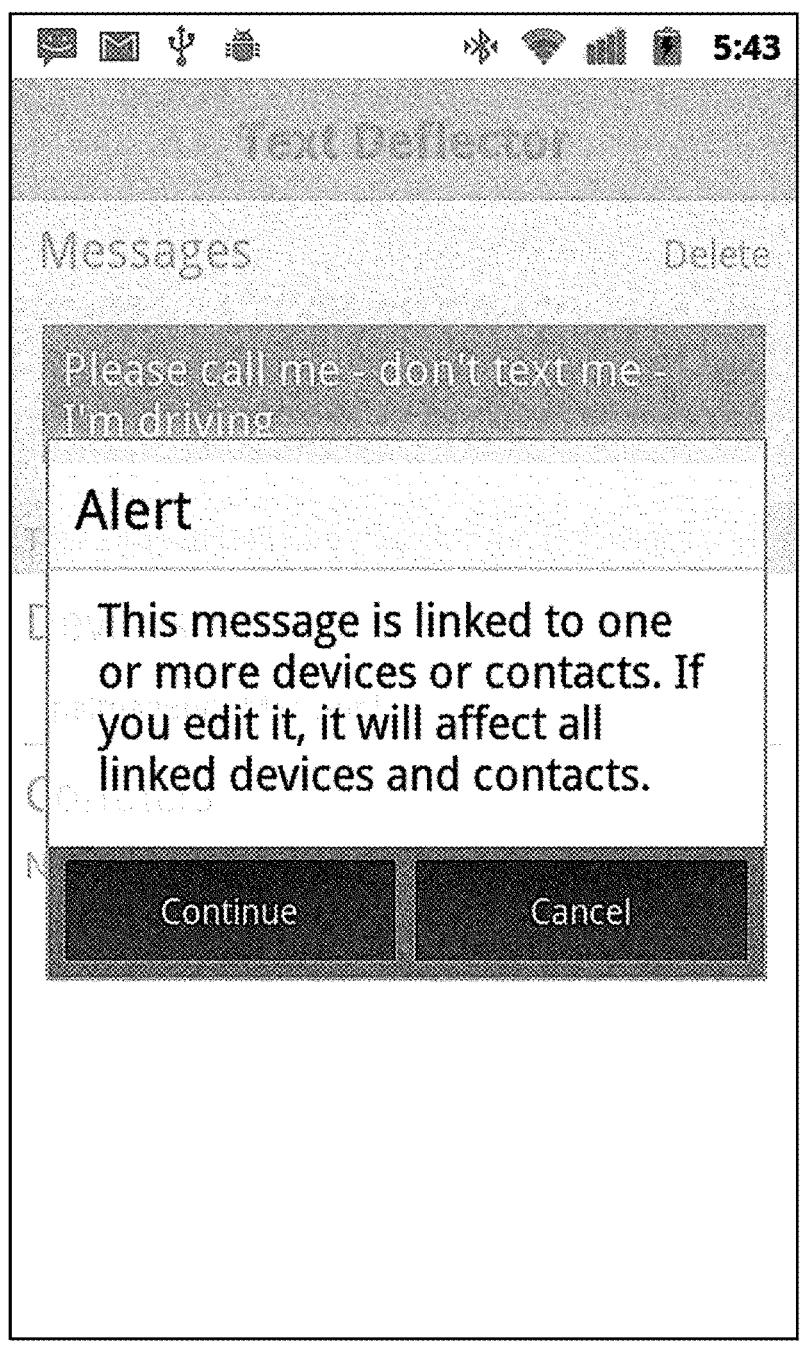
FIG. 4 shows a screenshot of one embodiment of a default message that the system is instructed to use whenever a particular peripheral is connected to the computerized device.

FIG. 4 shows a screenshot of a warning message that may be generated when the user attempts to edit an automatic reply message that has been associated with multiple peripherals, multiple contacts or a combination of contacts and/or one or more peripheral devices. Thus when opening and editing a peripheral linked automatic response message, if that particular peripheral automatic response message is also linked to any other peripheral or human contact, the system will show a popup alert warning the user to the effect that "This message is linked to one or more devices or contacts. If you edit it, it will affect all linked devices and contacts."

In this embodiment, after the user overrides the above (optional) warning, the use can then set the default auto answer message to be used when this particular peripheral is connected to the computerized system. Thus, for example, the user can configure the system so that if the user's smartphone (computerized system) detects that it is connected to the user's Bluetooth speaker phone (which is located in the user's automobile), the default auto answer message can be of the type: "Please don't text me, I'm driving".

The system can also be configured to be flexible, so that a previously set automatic answer message can be overridden by the user, such as by going to a messages screen (see FIG. 5A) and checking or entering in a different message automatic reply message. Alternatively, the user can also use a suitable control screen, such as the FIG. 5A messages screen, to go back and edit the message configuration screen such as shown in FIG. 3.

Figure 5A:
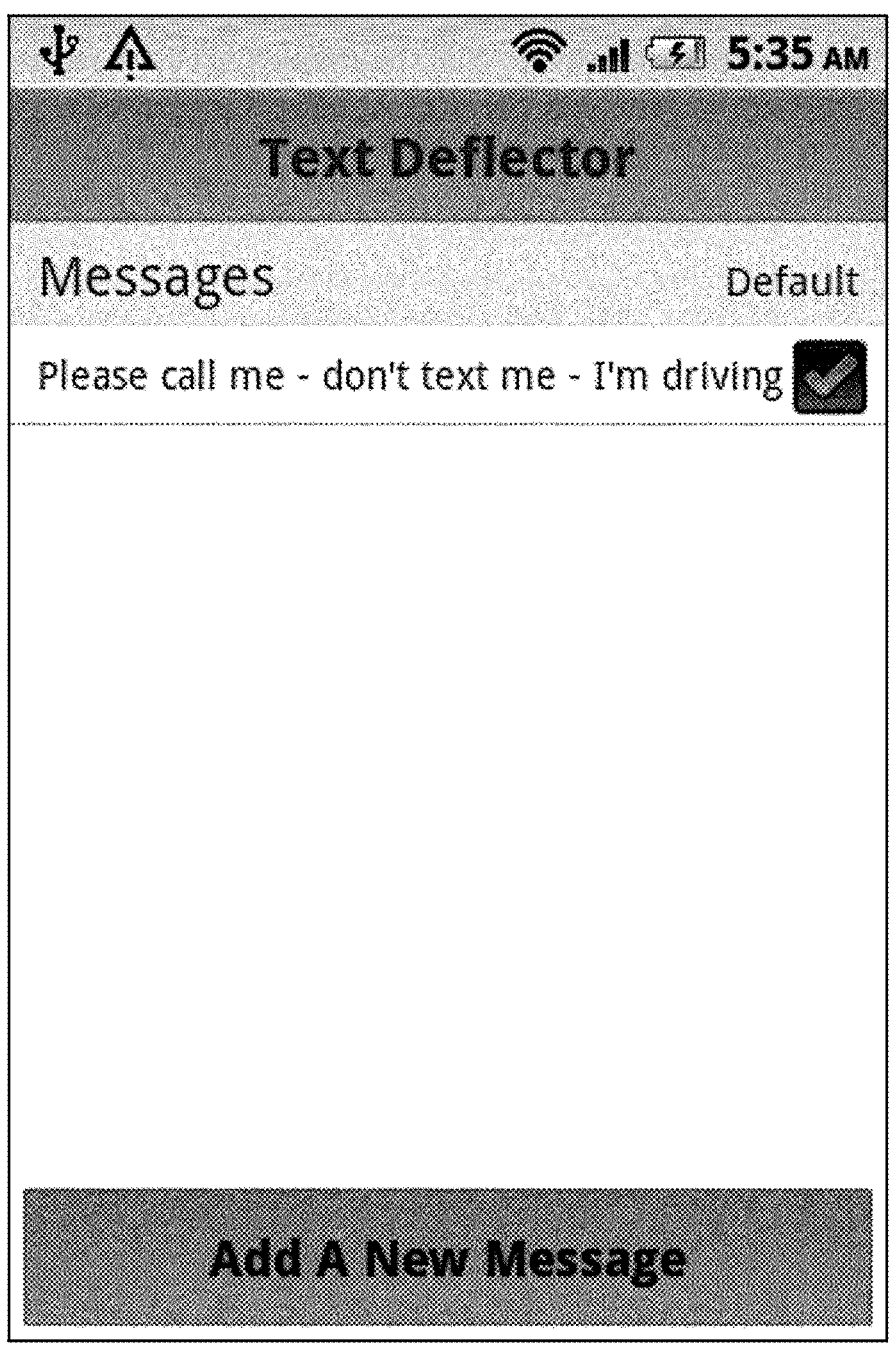
FIG. 5A shows a screenshot of one embodiment of an automated response message display screen that allows the user to easily pick and choose which automated response messages to set as the present default automated response message.

FIG. 5A shows a screenshot of an automated response message display screen that allows the user to easily pick and choose which automated response messages to set as the present default automated response message. Here the currently active default automatic response message is checked, and only one default has been presently entered into the system. However the user can enter other automatic responses messages via the "Add a New Message" command at the bottom of the screen. Once the user has added an additional message, the user can then select it (e.g. touch the appropriate touchscreen control) to make it active (i.e. set as an alternative current default message).

Figure 5B:
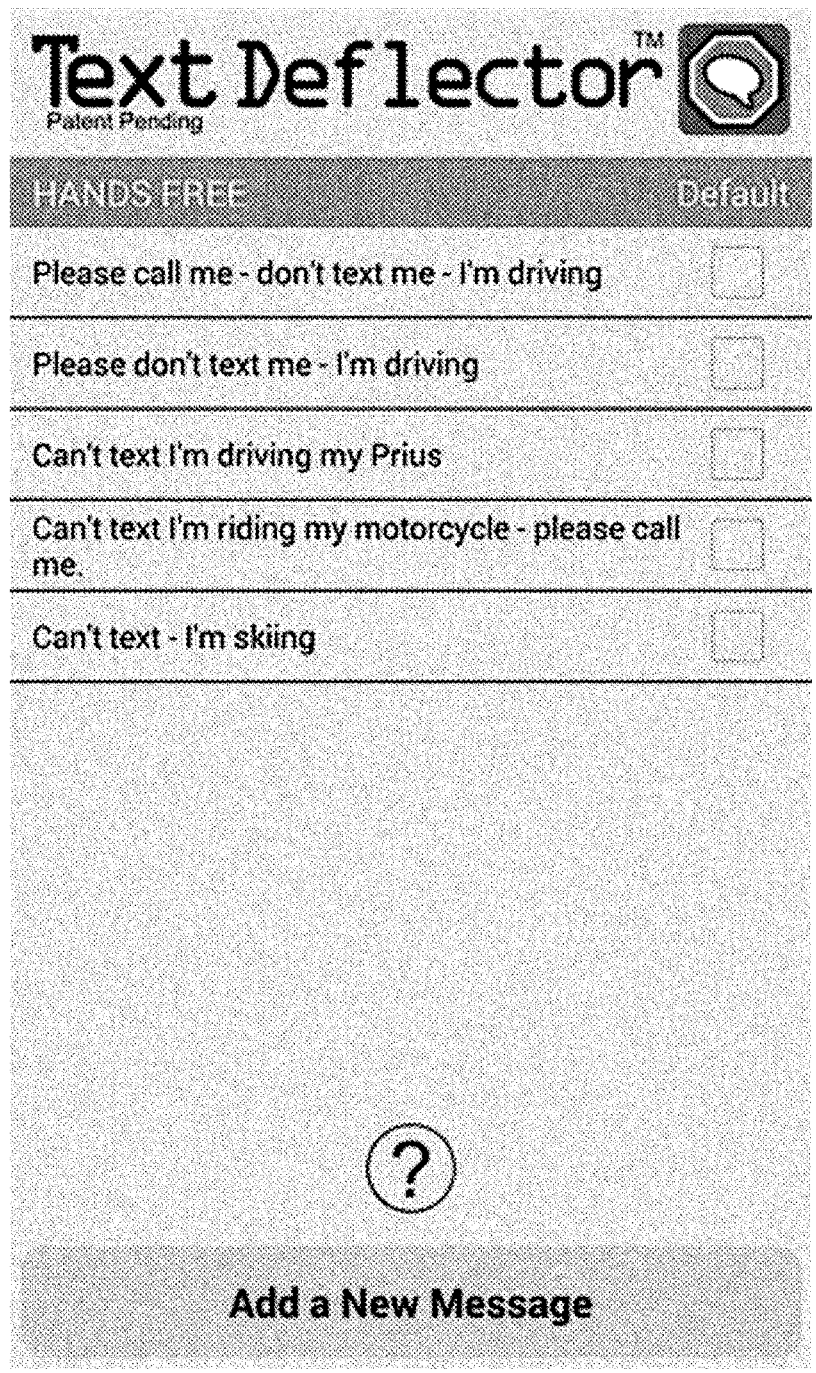
FIG. 5B shows a screenshot of the premium Android version of the product, in which the user is allowed to select among multiple different auto response messages. The user can again manually turn on or turn off this default as desired.

FIG. 5B shows a more populated automated message response display screen that allows the user to configure which, among various previously entered automatic response messages, the user wants a particular device (here the user's Toyota Prius' built in Bluetooth hands free speakerphone) to use as the default automatic response message.

Figure 6:
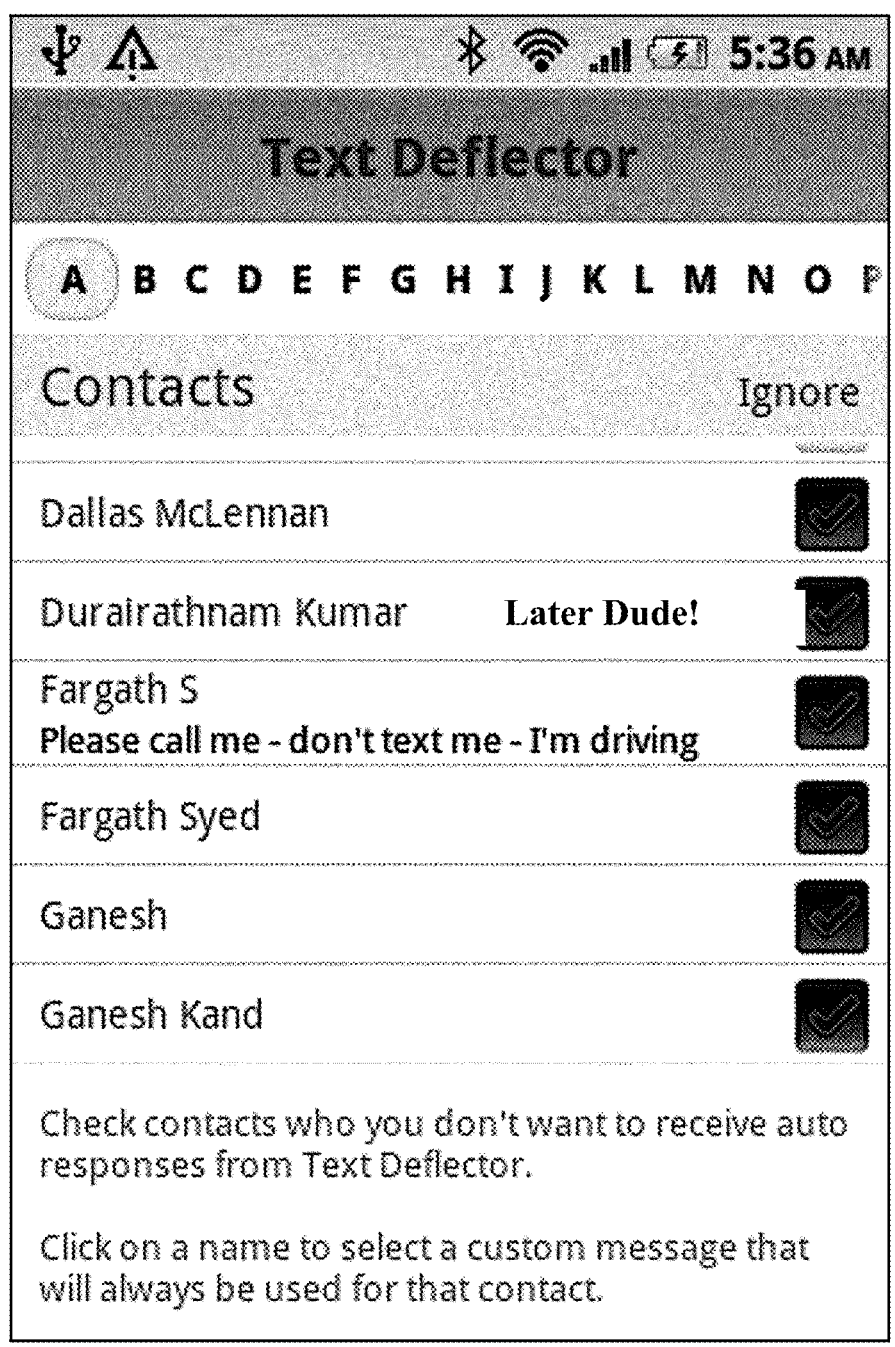
FIG. 6 shows a screenshot of one embodiment of a user's contact list, in which each individual contact may either be blacklisted from receiving automated message responses; or alternatively also be given contact specific customized automated response message that in turn will vary according to which particular peripheral is connected to the computerized device.

FIG. 6 shows a screenshot of the user's contact list. In some embodiments, each individual (and usually human or business) contact may also be given contact specific customized automated response message that in turn can be configured to vary according to which particular peripheral is connected to the computerized device. In other embodiments, the system can be configured so that the type of connected peripheral determines if the automated response message will be transmitted or not.

As FIG. 6 shows, in some embodiments, the system may list all contacts in the user's address book, and optionally select certain contacts to add to a "do not auto respond to texts from this contact" blacklist. In some embodiments, the user may also select (e.g. click on) a particular contact to set an override automatic response message that should be used to respond to that particular contact. Such contact specific override responses may then, for example, override any peripheral specific default automatic response that would be used otherwise. In some embodiments, the system may request user permission before sending out the automatic response message.

As an example, an employee may have set an informal and peripheral specific "Don't bug me Bro' I'm driving" automatic text response message that will normally operate whenever the employee's smartphone detects that the employee's smartphone is connected to the employee's automobile's Bluetooth speakerphone.

However if the employee may also set various contact specific overrides to this so that if the employee's smartphone detects from the contact list that it is the employee's boss or parents that are texting while the employee's smartphone is connected to the automobile, the system will then select a more formal text response such as: "Presently driving—will respond quickly when safe".

Thus in this scheme, a contact list specific automatic response may be set to always override a generic peripheral specific automatic response. Other prioritization schemes may also be used.

Note that although in this example, the contact list selected automatic response will override the peripheral device specific automatic response, the peripheral specific automatic response trigger may be set to still be operative. That is, the system may be configured so that a particular contact list selected automatic response will only be selected if a contact (e.g. text message) is received from that particular contact AND the system also detects that the particular peripheral associated with generating a "driving" trigger is present. Alternatively, the system can be configured so that a response is only sent if a peripheral is connected, or if manual mode (manual override) is active.

Thus in general, the system may use the presence or absence of specific peripherals as a trigger to transmit certain pre-selected automatic responses (or not). Which pre-selected automatic responses are then transmitted in response to that trigger may then depend on which contact generated the incoming message (e.g. activated a trigger) and then on the user set logic as to which automatic response to send out (e.g. the contact specific automatic response for that trigger, or a default response for that trigger) to use.

There is thus a potential matrix of contact and peripheral automatic response messages for all combinations of peripherals and contacts, as is shown in Tables 1A and 1B below:

TABLE 1A

Embodiment 1

| | Peripheral 1 (car) | Peripheral 2 (headset) | No peripheral default |
|---|---|---|---|
| Contact A (boss) | "Will respond soon" | "Working hard boss" | "Call me later" |
| Contact B (friend) | "Later dude" | "Call me bro" | "Sleeping or dead" |
| Contact C (ex-girlfriend) | "bug off" | "bug off" | "bug off" |
| All others (default) | "Driving . . . " | "Busy . . . " | "Can't respond now" |

TABLE 1B

Embodiment 2

| | Peripheral 1 (car) | Peripheral 2 (headset) | No peripheral default |
|---|---|---|---|
| Contact A (boss) | "Working hard boss" | "Working hard boss" | "Working hard boss" |
| Contact B (friend) | "Call me bro" | "Call me bro" | "Call me bro" |
| Contact C (ex-girlfriend) | "bug off" | "bug off" | "bug off" |
| All others (default) | "Driving . . . " | "Busy . . . " | "Can't respond now" |

In some embodiments, peripherals with no pre-set custom messages will be given a default message.

Alternatively, the matrix of automatic responses messages shown in table 1A or 1B may be set to give no automatic response at all if no peripherals are connected.

In some embodiments, the system can also be configured to respond to certain tags or flags or metadata encoded in various incoming messages.

For example, an incoming message may additionally contain an identifier informing the system of the type and/or intention of the incoming message. This can be a priority tag, such as a tag or data or metadata informing the user that the message has unusually high or low priority (e.g. "urgent", or 'spam") or that the message is of the sort deemed to be a possible distraction. When used in conjunction with the invention, the system may use this information to further select between the previously discussed plurality of response messages, or to choose not to send an automatic response.

Consider the situation where a peripheral connected device receives a SMS message which is further encoded with an identifier to reinforce that the type of message could be overly distracting to the operator of a vehicle (such as an "advertisement" or "spam" tag), without providing any compensating benefit. According to the invention, the auto-reply software can also be configured to use this "tag" information, in conjunction with peripheral connection status, to further determine if an automatic reply should be issued or not. Here an "urgent" tag might override a previous automatic reply command, while a "spam" tag might override a previous command to not issue automatic replies. Other types of tags or "metadata" may also be used to give the system additional information as to if to automatically reply to a given message, or not.

As another example, consider the case where a peripheral connected device receives a social media message further encoded with an identifier indicating that no automatic response should be sent. This identifier can be used to override a previously set command to always issue automatic replies when that peripheral connected device is connected.

Thus in this embodiment, the reply software can be further configured to use an incoming message identifier (or tag, or metadata) to select whether or not to retrieve (and/or send) at least one peripheral linked automatic reply.

Figure 7:
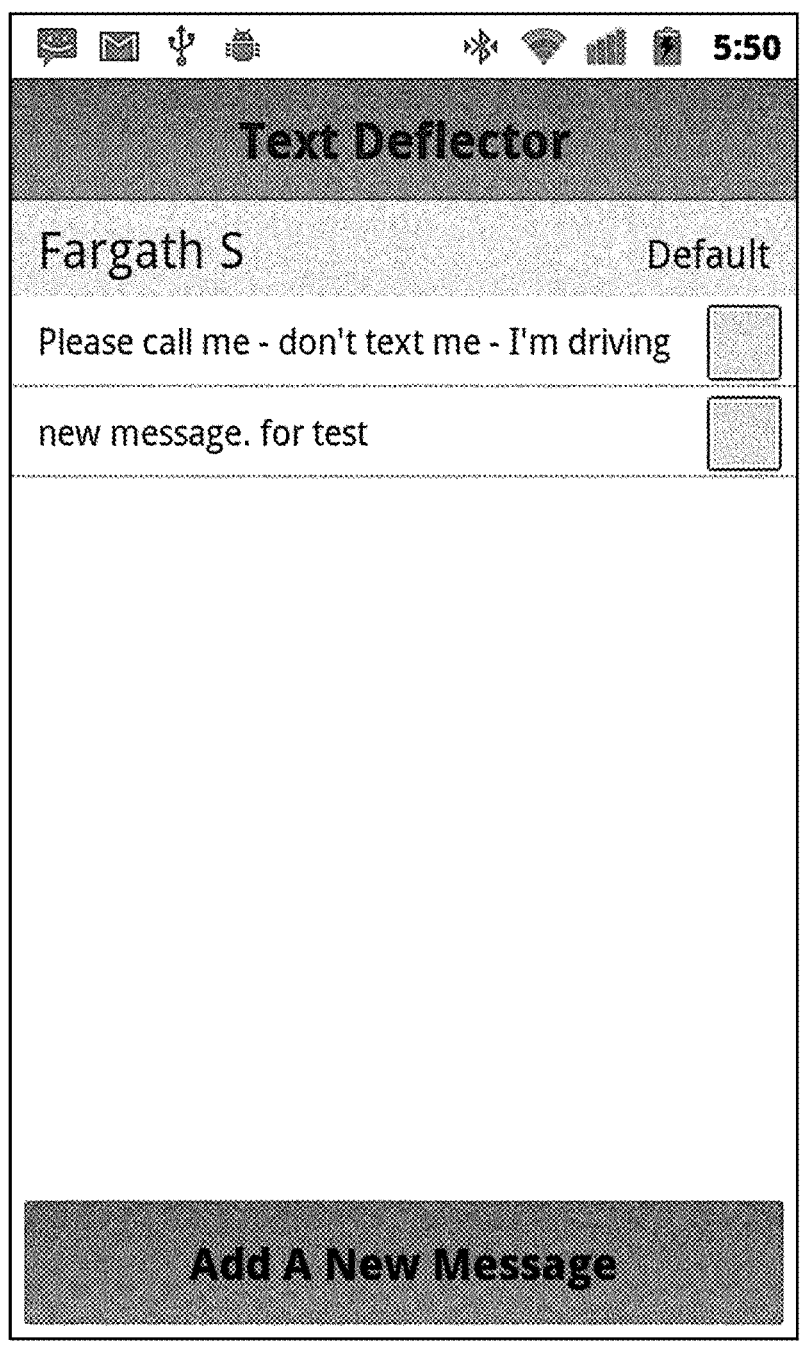
FIG. 7 shows how, in one embodiment, the user can, for each individual contact, select or edit a particular customized automated response message that will be used either regardless of which particular peripheral is connected to the computerized device, or according to which particular peripheral is connected to the computerized device.

FIG. 7 shows how, in some embodiments, the user can, for each individual contact, edit a particular customized automated response message that will be used according to which particular peripheral is connected to the computerized device.

In some embodiments, after selecting a particular individual or organization from the contact list, the user can then edit the automatic response to be selected for that particular contact. This is shown in FIG. 7, which shows how the user can set the message to be used when responding to texts from this contact. As before, the system may generate an optional warning message if the particular message being edited is also linked to other peripherals or contacts. Here as well, the user can either set the system in advance to use a previously selected automatic response to reply, or alternatively, the user can retain more control by turning this option on and off during use as desired.

In addition to the various app screens shown here, an app or other software according to the invention may have other user interface screens as well. For example, such an app or other software may also have a home screen or general configuration screen. This home or configuration screen may have, for example, various additional displays and functions such as:

- A checkbox/on-off control to turn the app on (where it will usually then run in the background) or off.
- Click-on headings to allow the user to quickly jump to other app screens with corresponding names or functionality that matches the heading.
- Click-on upgrade notices. Here, for example, if the app is being distributed as different free versions, as well as premium versions with more functions, the user can use an upgrade option to jump to another app screen that describes various extra features that may be provided by a premium version of the app.
- A showing of various default system settings, such as showing at least the first line of the app's current default automatic response message.

Use Examples

In the following examples, assume that the computerized system is a smartphone such as an Apple iPhone or Android smartphone, the user has downloaded and installed an app that implements the invention's methods, and that the user is then using the system to auto respond to incoming Short Message Service (SMS) messages (text messages).

Note that even if the invention's software is located entirely in the underlying operating system, rather than as an "app" that runs on top of the operating system, the invention's software is still going to be implemented as one or more modules of the operating system, and will typically make use of other operating system services (e.g. wireless stack services, user interface services, etc.) Thus in this discussion, the term "app" should be understood as referring to the software that implements the invention as described herein, rather than the particular location of the software.

It is less cumbersome, however, to use the case where the invention is being implemented in the form of an app running on a smartphone (e.g. as software running on the smartphone's processor or processors) in our discussions, rather than to always call out all options. Thus often in this disclosure, the invention will be referred to in the alternative as the "application" or "app" for short.

Using Bluetooth connected peripherals as a specific example; the computerized system (smartphone) may be configured to respond to an incoming SMS message as follows:

Case 1: application (app) is not active—nothing (no auto response) happens

Case 2: application is active, but none of the selected Bluetooth (BT) peripheral devices is in range—nothing happens (alternatively a default no-peripheral auto response may be provided).

Case 3: application is active and one or more of the selected Bluetooth peripheral devices is in range and/or connected, and the SMS sender is also listed as a contact in the smartphone's directory with a contact specific response message assigned—then the system, if previously authorized by the user, will auto reply with the user assigned contact specific message.

Case 4: application is active and one or more of the selected BT devices is in range and/or connected and the SMS sender is unknown or a contact with no response message assigned—then the system, if previously authorized by the user, will auto reply with current active peripheral specific message.

In this context, the "current active message" may be defined as follows:

Initially, upon setup, the first auto reply message entered by the user (e.g. —"message 1") can be initially selected by the system to be the current active message (at least until the user changes this), and the text of this first message can be the text of the current active message. In the case where only one auto reply message is being used, then the first auto reply message will be the only auto reply message.

As the user adds one or more additional (and optional) custom messages (and optionally checks off these messages), whatever auto reply message the user selects will be used by the system as the current active message.

If a selected peripheral, such as a Bluetooth device peripheral comes into range (i.e. connects with) of the computerized device, and if this particular peripheral does not have a default message set yet, then the fact that the peripheral is now communicating with the computerized device will have no effect on the auto reply message. In this case, the current active auto reply message will remain unchanged from whatever the last active message was.

Alternatively, the system may be configured so that if no peripherals are connected, the invention's automatic response software may be bypassed, and instead, the computerized system's generic default automatic reply message (assuming that one has been previously specified) may be provided instead. However if a selected peripheral with a previously specified default auto reply message is connected to the computerized device, then the peripheral specific auto reply message then becomes the current active message.

Similarly, if a second (or third) selected peripheral with a previously specified auto reply message is connected to the computerized device, it may be convenient (as previously discussed) to configure the invention software so that the auto reply associated with the last connected peripheral is chosen as the current active message. Alternatively, and also as previously discussed, the invention may allow the user to configure a peripheral priority order in which the auto reply message associated with the peripheral with the highest priority is automatically chosen as the current active message.

To change the current active auto reply messages, the user may also view a message configuration screen, such as FIG. 5, and select a different auto reply message to be the current active auto reply message.

In some "last connected peripheral device controls" type embodiments, a peripheral, upon connection with the computerized device (e.g. smartphone) will set the active auto reply message upon connection (i.e. coming within range if the peripheral is a Bluetooth connected peripheral). However in these embodiments, it is the act of peripheral connection itself that determines the auto reply, at least if the user has previously authorized this type of operation. That is, the continued connection of previously connected peripherals may not control the status of the active auto reply message, because the auto reply associated with the last connected peripheral dominates.

Even here, of course, the user can always change the active auto reply message manually by simply bringing up the list of messages (see FIG. 5) and setting another message as the currently active auto-reply message.

Pseudo Code Examples

In the following examples, certain aspects of the function of smartphone app software that implements certain embodiments of the invention are shown using pseudo code. Note that these pseudo code examples primarily focus on the selection of the current response message, rather than on details of the response mode activation process.

```
// $message should persist between sessions and reboots
global $message="Please call me—don't text me—I'm driving—Sent from <device's phone number> by Text Deflector"; // init on app install only
   device::on_ connect( ) {
   if ($self→linked_message)
      $message=$self→linked_message;
   }
   device::on_ disconnect( ) {
   if ($self→linked_message and $message $self→linked_message)
      // Fall back to global default message;
      $message=$messages→default;
   }
   controller::messages_screen::on_check( ) {
   // This is the main Messages screen (not the device or contact select variant)
   if (!$self→device and !$self→contact)
      $message=$self→messages→selected;
   // This is the Messages screen for a specific Contact
```

```
elseif ($self→contact)
    $self→contact→linked_message=$self→messages→selected;
// This is the Messages screen for a specific Device
elseif ($self→device)
    $self→device→linked_message=$self→messages→selected;
}
sms::on receive( ) {
if ($self→sender→linked_message)
    $self→reply($self→sender→linked_message)
else
    $self→reply($message);
}
```

Subsequent Publication and Making Available to the Public

On Jul. 20, 2013, the inventors, under the name of "Suite B Media Inc." published a first version of the invention, entitled Text Deflector as an Android app on the Google Play store. They also publicized the invention on their Twitter feed at: https://twitter.com/textdeflector On Sep. 1, 2013, the inventors published a YouTube video describing the Text Deflector system in operation as "Text Deflector—The Automated Autoresponder" at: https://www.youtube.com/watch?v=hucE17dFvJc On Nov. 26, 2013, the inventors published a description of the improved version of the invention at http://www.bikeland.org/news-story.php?newsID=74286.

This press release stated:

"Announcing Text Deflector 2.0 (www.textdeflector.com), the smart phone app designed to provide a safer driving environment for everyone. Text Deflector is a free app (with no ads) that's designed to take the impulse to respond to texts away from drivers so they can focus on the task at hand . . . driving safely.

Text Deflector's patent pending technology works by sensing and linking to your in-car handsfree device (Bluetooth or wired headset) and automatically responds for you without any user input whatsoever to any incoming texts. Text Deflector notifies the sender that the driver is unavailable and optionally requests that the sender call instead.

Text Deflector 2.0 not only responds to SMS (text) messages while you're driving, now it will also respond to WS (picture and video) messages so you don't get distracted by any pictures sent to you when you're traveling down the Interstate."

"This is an app that should come pre-installed in every phone for the safety of the driving community," says Suite B Media's director of marketing, Loralee Fultz (Hajdu). "Text Deflector is simple to use—just launch the app and assign it to any hands-free device and it's ready to go."

The newer 2.0 version of the application was described as having the new features:

Responds to both SMS & MMS
System Tray Icon shows when App is active
Flood Control Filter—stops responding to repeated texts
Ignores Unknown Numbers and new Check All Contacts option
Maintains a record of auto responses
All New Interface/Look
Help and FAQ On Dec. 17, 2013, the inventors then published an upgraded 2.0 version of Text Deflector on the Google play store.

As described on the Google play store, Test Deflector 2.0 was described as:

"Text Deflector 2.0 automatically responds to your incoming texts (both SMS and WS) while you're driving and does it safely, without any user input. Text Deflector works by sensing and linking to your in-car handsfree device (Bluetooth or wired headset) and automatically responds to any incoming texts, notifying the sender that the driver is unavailable.

No data is collected, GPS services are not used, and there's no additional drain on your battery."

The inventors further described the system as being completely automatic, not locking the user to a service provider or carrier, and sensing your peripheral devices automatically with no manual input. Other advantages listed were that the system was not GPS based or motion based, maintains user privacy, and allows users to import contacts for customization. Additional advantages are that the system does not cause additional battery drain.

A premium (paid for) version of Text Deflector also allows users to provide custom response messages, select multiple paired Bluetooth devices, assign a custom message to each Bluetooth device, and assign a custom message to each of the user's contacts. The premium version also offers a manual mode that could be enabled via a timer (useful if a connected peripheral is not available).

In some embodiments, the invention may be further configured so that the system may further use time of day or date as another auto response option.

Preventing Distracted Driving

In some embodiments, the invention may also be a method of using device connection status, such as the connection status of a Bluetooth peripheral device, to reduce the risks of distracted driving (or other operation of any other type of equipment or method of conveyance) and perform other functions. Here, the invention operates by managing auto response replies to data on a computerized system, such as Smartphone incoming messages while the Smartphone's user is driving. As usual, these Smartphones will generally be equipped with at least one computer processor, memory, display, cellular network transceiver, Bluetooth transceiver, Smartphone software (e.g. Android, iOS, Blackberry, Windows mobile software, and the like), as well as the invention's automatic response software.

In this embodiment, the peripheral will generally be a Bluetooth peripheral that is normally associated with the vehicle that the user is driving, or other equipment that the user is using. Although this Bluetooth peripheral may be a built-in automobile Bluetooth peripheral, other options are also possible. Here, for example, Bluetooth peripherals that are normally kept in the vehicle, such as visor mounted Bluetooth speakerphones, after-market Bluetooth GPS devices, and the like may also be used. As is standard for Bluetooth peripherals, each Bluetooth device will have its own peripheral identification code.

Here, when the user enters the vehicle (or interacts with other equipment), the Smartphone (or other computerized system) will detect the presence of various vehicle (or other equipment) associated Bluetooth peripherals (or other devices), and form a connection, such as a wireless Bluetooth connection with them. The invention's software can then, for example, detect this connection, determine that a vehicle associated Bluetooth device has been connected using the peripheral (or other device) identification code, and (for example) assign at least one Bluetooth vehicle associated peripheral linked automatic reply to this at least one Bluetooth peripheral identification code. This can be saved in memory.

Thus, when a particular device is connected using a method of connectivity, the system may use replay software running on at least one processor, and at least one device identification code that is individually identifiable by the computerized system, to assign at least one (and often a plurality of) device linked automatic replies to the at least one device identification code.

Thus when a particular vehicle associated Bluetooth peripheral is wirelessly connected to the Smartphone, the invention's automatic reply software will use the vehicle associated Bluetooth peripheral's peripheral code to retrieve that particular automatic reply from memory. Thus when in response to incoming messages (e.g. SMS messages, MMS messages) the system can then retrieve the relevant automatic reply from memory, and (at least if previously authorized by the user) use it to automatically respond to the particular incoming message.

The system can also be configured to configure automatic replies to other types of incoming messages as well, such as incoming video messages (e.g. FaceTime calls, Google Duo calls, and the like).

Silent operation: Although the following silent operation mode can be used for many different embodiments of the invention, it will often be desirable to further configure the automatic reply software to mute sounds produced by the Smartphone in response to various incoming messages and/or the various automatic replies when the system determines that the user may be driving. Here, various methods may be used to determine if the user is driving, including input from motion sensors, sound profiles, triangulation versus various cellular tower transceivers, detecting differences in local WiFi systems, and the like.

Disabling autoresponse/ignoring certain incoming messages: Some telecommunications service providers routinely provide "new voicemail received" notices. Although some services routinely label these "new voicemail received messages" with the SMS identification or other identification of the caller that provided the voicemail, others do not. Other services, for example, label these "new voicemail received messages" with the service provider's set ID.

In order to have the invention distinguish between these two types of situations, it can be useful to further configure the system to check incoming messages versus a defined a text string or pattern. Alternatively, metadata associated with the incoming message may also be examined as well. If this defined text string or pattern or metadata value is detected, the system can be configured to automatically disable the system's auto response functions for these types of incoming messages. So, for example, if the incoming message contains key terms such as "voicemail", then the system can be instructed to ignore the incoming message, rather than to auto respond to the message.

Use as a Standard Part of a Smartphone Operating System

Although in this disclosure, the various embodiments disclosed herein have been in the form of aftermarket, user installed, apps, in other embodiments, the methods described herein may instead be implemented as part of the standard smartphone operating system. In this later embodiment, the invention's features can thus be automatically provided for all smartphones using these operating systems. Because of the major burden that distracted driving places on society in the form of loss of life and injury, the invention (e.g. the "reply software") could in turn help save lives if it was made a standard component of a smartphone OS.

OTHER EMBODIMENTS

In other embodiments, the invention may be used in situations where using the presence of a connection to trigger a broader variety of different auto responses is desired. For example, in other embodiments, the invention may be used in conjunction with a smartphone configured to detect a work office related WiFi system. Here the smartphone can be configured so that detection of the work WiFi signal triggers a "Can't chat, I'm at work" type auto response for either incoming calls or text messages.

Similarly, other types of signals can also be used to trigger the invention. These other signals can include near field communication (NFC) signals, Bluetooth beacons, Bluetooth location services, the previously discussed WiFi signals, and so on. These signals may be located in the previously discussed work environments, and other areas such as theatres (cinemas), concert venues, schools, factories, hospitals, churches, and the like.

In some embodiments, the invention may also be configured to monitor other parameters, such as ambient noise levels, and allow the user to configure the auto response according to various user set parameters. For example, the user may set the invention to auto respond to incoming messages when the ambient noise levels are overly high. Alternatively, the user may wish to configure the system so that if the ambient noise is unusually quiet, then the system should do a silent auto response.

Trademarks: Bluetooth® is a registered trademark of the Bluetooth SIG, Inc.

The invention claimed is:

1. A method of using peripheral connection status to select between at least one response replies to data on a handheld computerized device, said method comprising:
   obtaining a handheld computerized device, and at least one peripheral device capable of connecting with said handheld computerized device;
   said handheld computerized device comprising at least one processor, handheld computerized device memory, at least one wireless cellular network transceiver, and reply software running on said at least one processor;
   each said at least one peripheral device having a device identification code that is individually identifiable by said handheld computerized device as a result of determining said status of said at least one peripheral device connection to said handheld computerized device;
   using said reply software and said at least one processor to assign at least one peripheral device linked automatic replies to at least one peripheral device identification code, and storing said at least one peripheral device linked automatic replies in said handheld computerized device memory;
   wherein when said at least one peripheral device is connected to said handheld computerized device, said reply software will determine said at least one peripheral device's said peripheral device identification code, and use said at least one peripheral device identification code to select and retrieve at least one peripheral linked automatic reply from said at least one peripheral device linked automatic replies from said handheld computerized device memory; and
   wherein in response to an incoming message obtained from said at least one wireless cellular network transceiver, using an automatically selected and retrieved at least one peripheral connection linked automatic reply to respond to said incoming message;
   and wherein said peripheral device is different from a device transmitting said incoming message.

2. The method of claim 1, wherein said reply software further comprise a list of at least one dataset;
   further assigning at least one automated reply and a reply priority to at least one item on said list of at least one dataset;

assigning a reply priority to said at least one peripheral device;

determining a relative priority between said peripheral device linked automatic replies and contact assigned automated replies;

and using said relative priority to determine if an interaction from an item on said list of at least one dataset should be automatically managed by either said peripheral device linked reply or a reply linked to said list of at least one dataset.

3. The method of claim 1, wherein said handheld computerized device is a smartphone, or tablet computer.

4. The method of claim 1, wherein said peripheral device connects to said handheld computerized device using a wire or any other physical connection.

5. The method of claim 1, wherein said peripheral device connects to said handheld computerized device using any of a Bluetooth, WiFi, or other wireless connection.

6. The method of claim 1, wherein said at least one peripheral connection linked automatic reply differs according to an item in a dataset that sent said incoming message, and a peripheral connection ID of a peripheral device last connected to said handheld computerized device.

7. The method of claim 1, further used to help prevent distracted driving or operation of any other type of equipment or any method of conveyance;

wherein said at least one peripheral device is an equipment associated peripheral device;

wherein when said handheld computerized device is brought in close proximity with said equipment associated peripheral device, said reply software automatically detects said equipment associated peripheral device, and automatically configures said handheld computerized device to automatically respond to at least one incoming message with a response message that is customized for an originator of said at least one incoming message.

8. The method of claim 1, wherein said incoming message is any of an SMS message, an MMS message, or any type of communication including any communication with picture or video content, notification, social media interaction, alert or other type of incoming video content.

9. The method of claim 1, further used to reduce risk of distracted operation of any given piece of equipment by using a peripheral connection status of a peripheral device to manage auto response replies to incoming information or communications while a user of said handheld computerized device is also utilizing said equipment.

10. The method of claim 1, wherein said handheld computerized device further comprises a Bluetooth transceiver and a graphical user interface, said at least one peripheral device comprises a Bluetooth peripheral device, and said peripheral device identification code comprises a Bluetooth peripheral device identification code.

11. The method of claim 1, wherein said handheld computerized device further comprises a graphical user interface;

further using said graphical user interface to assign a plurality of peripheral device linked automatic replies to at least one peripheral device identification code.

12. The method of claim 1, wherein said reply software further selects and retrieves said at least one peripheral linked automatic reply based on the peripheral device identification code of the last connected peripheral device.

13. The method of claim 1, wherein in response to an incoming message obtained from said at least one wireless cellular network transceiver, further using said automatically selected and retrieved at least one peripheral connection linked automatic reply to automatically respond to said incoming message.

14. The method of claim 1, wherein in response to an incoming message obtained from said at least one wireless cellular network transceiver, using an automatically selected and retrieved at least one peripheral connection linked automatic reply and further requesting handheld computerized device user input before automatically responding to said incoming message.

15. The method of claim 1, wherein said reply software further uses an incoming message identifier to select whether or not to retrieve said at least one peripheral linked automatic reply.

16. A handheld computerized device, comprising:

at least one processor, handheld computerized device memory, at least one wireless cellular network transceiver, and reply software;

said handheld computerized device configured to individually identify at least one peripheral device having a peripheral device identification code as a result of determining a status of said at least one peripheral device connection to said handheld computerized device;

said reply software, and said at least one processor configured to assign at least one peripheral device linked automatic reply to at least one peripheral device identification code, and store said at least one peripheral device linked automatic reply in said handheld computerized device memory;

said handheld computerized device and said reply software configured so that when said at least one peripheral device is connected to said handheld computerized device, said reply software determines said at least one peripheral device identification code, said peripheral device's identification code not being a telephone number, and uses said at least one peripheral device identification code to select and retrieve at least one peripheral linked automatic reply from said at least one peripheral device linked automatic replies from said handheld computerized device memory; and said handheld computerized device and said reply software are configured to use an automatically selected and retrieved at least one peripheral connection linked automatic reply to respond to an incoming message obtained from said at least one wireless cellular network transceiver; and wherein said peripheral device is different from a device transmitting said incoming message.

17. The device of claim 16 further configured to help prevent distracted driving or vehicle operation;

wherein said at least one peripheral device is a vehicle associated Bluetooth peripheral device;

said reply software further configured so that when said handheld computerized device is brought in close proximity with said vehicle associated Bluetooth peripheral device, said reply software is configured to automatically detect said vehicle associated Bluetooth peripheral device, and automatically configures said handheld computerized device to automatically select a response to at least one incoming message with at least one Bluetooth peripheral device linked automatic reply from said handheld computerized device memory.

18. The device of claim 16, further configured to help prevent distracted driving or operation of any other type of equipment;

wherein said at least one peripheral device is an equipment associated peripheral device;

wherein when reply software is further configured so that when said handheld computerized device is brought in close proximity with said equipment associated peripheral device, said reply software is configured to automatically detect said equipment associated peripheral device, and automatically configures said handheld computerized device to automatically respond to at least one incoming message with a response message that is customized for an originator of said at least one incoming message.

19. The device of claim 16, wherein said peripheral device is configured to connect to said handheld computerized device using a wire or any other physical connection.

20. The device of claim 16, wherein said peripheral device is configured to connects to said handheld computerized device using any of a Bluetooth, WiFi, or other wireless connection.

21. The device of claim 16, wherein said handheld computerized device and said reply software are configured to use an automatically selected and retrieved at least one peripheral connection linked automatic reply to automatically respond to an incoming message obtained from said at least one wireless cellular network transceiver.

22. The device of claim 16, wherein said handheld computerized device and said reply software are configured to use an automatically selected and retrieved at least one peripheral connection linked automatic reply, and handheld computerized device user input, to automatically respond to an incoming message obtained from said at least one wireless cellular network transceiver.

* * * * *